United States Patent
Seifi et al.

(10) Patent No.: US 10,349,414 B2
(45) Date of Patent: Jul. 9, 2019

(54) SCHEDULED TRANSMISSION IN CELLULAR COMMUNICATIONS NETWORKS

(71) Applicant: Telefonaktiebolaget LM Ericsson (publ), Stockholm (SE)

(72) Inventors: Nima Seifi, Solna (SE); Mikael Coldrey, Borås (SE); Thommy Svensson, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/508,654

(22) PCT Filed: Sep. 8, 2014

(86) PCT No.: PCT/EP2014/069113
§ 371 (c)(1),
(2) Date: Mar. 3, 2017

(87) PCT Pub. No.: WO2016/037639
PCT Pub. Date: Mar. 17, 2016

(65) Prior Publication Data
US 2017/0280432 A1     Sep. 28, 2017

(51) Int. Cl.
*H04W 72/04*     (2009.01)
*H04B 7/024*     (2017.01)
(Continued)

(52) U.S. Cl.
CPC .......... *H04W 72/046* (2013.01); *H04B 7/024* (2013.01); *H04B 7/0617* (2013.01);
(Continued)

(58) Field of Classification Search
CPC ...... H01Q 1/246; H01Q 21/061; H01Q 21/24; H01Q 21/28; H01Q 25/00; H01Q 3/00;
(Continued)

(56) References Cited

U.S. PATENT DOCUMENTS 7,274,677 B1 * 9/2007 Lewis ................. H04B 7/0617
                                                                370/310.2
9,521,560 B2 * 12/2016 Sundaresan ............. H01Q 3/00
(Continued)

FOREIGN PATENT DOCUMENTS

EP     2 405 707 A1     1/2012

OTHER PUBLICATIONS

International Search Report and Written Opinion issued in International Application No. PCT/EP2014/069113, dated May 21, 2015, 9 pages.
(Continued)

*Primary Examiner* — Matthew C Sams
(74) *Attorney, Agent, or Firm* — Rothwell, Figg, Ernst & Manbeck, p.c.

(57) ABSTRACT

There is provided a system for scheduled transmission from at least two network devices in a cellular communications network. The system comprises at least two network devices. Each respective network device is configured to transmit in sectors using directional transmission beams. The at least two network devices are configured to transmit in the sectors according to a beamforming pattern according to which concurrent received power from all but one of the at least two network devices in sectors in which more than one network device is enabled to transmit using the directional transmission beams is below a threshold interference power level.

24 Claims, 7 Drawing Sheets

(51) Int. Cl.
*H04B 7/06* (2006.01)
*H04W 16/28* (2009.01)
*H04W 72/08* (2009.01)
*H04W 72/12* (2009.01)

(52) U.S. Cl.
CPC ......... *H04W 16/28* (2013.01); *H04W 72/082* (2013.01); *H04W 72/12* (2013.01)

(58) Field of Classification Search
CPC .. H01Q 3/26; H01Q 3/34; H01Q 3/36; H01Q 3/40; H04B 7/0617; H04B 7/0417; H04B 7/0452; H04B 15/00; H04B 17/24
See application file for complete search history.

(56) References Cited

U.S. PATENT DOCUMENTS

| | | | | |
|---|---|---|---|---|
| 2006/0135169 A1* | 6/2006 | Sampath | ............ | H04L 25/0222 455/447 |
| 2006/0238268 A1* | 10/2006 | Kwun | ................ | H04B 7/0452 333/20 |
| 2007/0243878 A1* | 10/2007 | Taira | ................ | H04B 7/024 455/450 |
| 2009/0296663 A1* | 12/2009 | Wild | ................ | H01Q 1/246 370/335 |
| 2010/0008311 A1* | 1/2010 | Oh | ................ | H04W 16/02 370/329 |
| 2010/0033374 A1* | 2/2010 | van Rensburg | ........ | H01Q 1/246 342/368 |
| 2011/0002371 A1* | 1/2011 | Forenza | ............... | H04B 7/0417 375/227 |
| 2011/0150114 A1* | 6/2011 | Miao | .................... | H04B 7/0417 375/260 |
| 2011/0223928 A1* | 9/2011 | Seo | ........................ | H04B 7/024 455/452.1 |
| 2013/0005376 A1* | 1/2013 | Shirani-Mehr | ..... | H04W 72/048 455/509 |
| 2013/0090141 A1* | 4/2013 | Hottinen | ........... | H04W 72/1231 455/501 |
| 2013/0194950 A1* | 8/2013 | Haghighat | ............ | H04W 24/02 370/252 |
| 2014/0225777 A1* | 8/2014 | Harel | ....................... | H01Q 3/00 342/373 |
| 2015/0003406 A1* | 1/2015 | Athley | .............. | H04W 72/0453 370/330 |
| 2015/0288427 A1* | 10/2015 | Wang | ................ | H04W 72/1273 370/329 |
| 2016/0127003 A1* | 5/2016 | Xu | ........................ | H01Q 1/246 455/562.1 |
| 2018/0006379 A1* | 1/2018 | Cariou | .................. | H04W 16/28 |

OTHER PUBLICATIONS

European Communication issued in Application No. 14 761 834.2-1215 dated Feb. 7, 2018, 4 pages.
European Office Action issued in Application No. 14761834.2 dated Oct. 29, 2018, 4 pages.

* cited by examiner

SCHEDULED TRANSMISSION IN CELLULAR COMMUNICATIONS NETWORKS

CROSS REFERENCE TO RELATED APPLICATION(S)

This application is a 35 U.S.C. § 371National Stage of International Patent Application No. PCT/EP2014/069113, filed Sep. 8, 2014, designating the United States, the disclosure of which is incorporated by reference.

TECHNICAL FIELD

Embodiments presented herein relate to scheduled transmission in a cellular communications network, and particularly to methods, a scheduling and network entity and a network device, computer programs, and a computer program product provide for scheduled transmission from at least two network devices in a cellular communications network.

BACKGROUND

In communications networks, there may be a challenge to obtain good performance and capacity for a given communications protocol, its parameters and the physical environment in which the communications network is deployed.

For example, future generations of wireless communications networks may provide ubiquitous high data-rate coverage. Currently emerging standards for wireless communications networks, such as Long Term Evolution Advanced (LTE-Advanced) from the 3rd Generation Partnership Project (3GPP), are targeted to support up to 1 Gbps in the downlink (from radio access network nodes to portable wireless devices) and 500 Mbps in the uplink (from portable wireless devices to radio access network nodes). Achieving such data rates requires a significant improvement in the experienced signal-to-interference-plus-noise ratio (SINR) at the receiver nodes. The use of multiple antennas at both the transmitter node and the receiver node is an interesting approach to provide a remarkable increase in the data rates and reliability of wireless transmission in a point-to-point scenario. However, in frequency reuse-1 wireless systems, in which multiple transmitter-receiver pairs (where one transmitter-receiver pair may consist of one radio access network node and one portable wireless device) operate concurrently and independently over the same time/frequency resources, the transmission between each transmitter-receiver pair commonly causes interference to neighboring transmitter-receiver pairs, resulting in a low experienced SINR at the receiver nodes. This may be crucial if the receiver node is farther from its desired transmitter node and closer to the interfering transmitter nodes. An embodiment of such a scenario is illustrated in FIG. 1.

FIG. 1 is a schematic illustration of intercell interference in a two-cell network 10 where each radio access network node 11a, 11b, (or base station, BS) serves a portable wireless device 14a, 14b (or user equipment, UE) in its own cell 12a, 12b using antenna arrays 15a, 15b to transmit transmission beams $w^{(1)}$ and $w^{(2)}$, respectively. More particularly, each BS transmits data in the downlink to a UE located at the cell boundary of its own cell on the same to time/frequency resource as the other BS. According to the illustrative example the UEs receive a severe intercell interference from the neighboring BS and hence experience a low SINR.

In general terms, beamforming is a technique for directional signal transmission and/or reception. With an array of multiple antennas it is, by using beamforming, possible to direct the wavefront in a specific direction by applying an appropriate weight at each antenna element. FIG. 2 schematically illustrates an antenna array 15a, 15b, 15c configured to transmit the signal x using N beam forming weights $w_i(\theta_{tilt})$, where i=1, ..., N and where $\theta_{tilt}$ represent a tilting angle. In general terms, the overall radiation pattern of the antenna array is determined based on the number of antennas, their patterns, their relative positions, and their corresponding weights.

Consider now the two-cell communications network in FIG. 1. The complex-baseband received signal y at a desired UE can be written as $$y = H_s w_s x_s + H_I w_I x_I + n. \quad (1)$$

In (1), $H_s$ denotes the desired channel state information (CSI) matrix between the antennas of the UE and those of the desired BS, while $H_I$ indicates the interfering CSI matrix between the antennas of the UE and those of the interfering BS. In addition, $w_s$ and $w_I$ are the beamforming vectors applied at the desired and interfering BSs, respectively, while $x_s$ and $x_I$ denote the data symbols transmitted from the desired and interfering BSs, respectively. Finally, n represents additive white Gaussian noise.

In general terms the CSI matrix contains knowledge about radio propagation channel and antenna gains. This information describes, at least partially, how a signal propagates from a transmitter to a receiver. Hence, obtaining CSI enables the BS to perform efficient transmission towards an intended UE by dynamically adapting to the current channel conditions, and/or to suppress the interference towards a non-intended UE. This may be crucial for achieving reliable communication with high data rates in any to communications network.

In order to describe different beamformers, it is assumed that each transmission point j has the possibility to individually apply one of a finite number of beamformers that are indexed as b=1, 2, ..., B. Hence, for the ease of notation, the b-th beamformer of the j-th transmission point is denoted $w_b^{(j)}$. One example of beamforming, in the case of downlink transmission, is illustrated in FIG. 3. As can be seen in FIG. 3, the BS 11a, corresponding to transmission point j, is able to perform beam selection between three different beams $w_1^{(j)}$, $w_2^{(j)}$, and $w_3^{(j)}$, corresponding to b=1, 2, 3. Furthermore, the BS is illustrated as currently transmitting using the beamformer $w_2^{(j)}$ ) which results in the peak of the BS's main beam to be directed towards the illustrated portable wireless device 14a. In this case the UE 14a receives a stronger signal from the BS compared to the case where either of the beamformers $w_1^{(j)}$ or $w_3^{(j)}$ is used.

One approach to enhance the SINR over the cell area is to use the so-called coordinated multipoint transmission (CoMP). In CoMP multiple geographically separated transmission/reception nodes coordinate their transmission/reception to improve the coverage of high data rates, and/or to increase the cell-edge and average throughput. In particular, one goal is to distribute the UE perceived performance more evenly in the network by taking control of the interference in the network, either by reducing the interference and/or by better prediction of the interference.

In one simple form of CoMP, commonly denoted as coordinated beamforming, each UE communicates with its serving BS, exactly as in conventional cellular wireless networks (i.e., cellular wireless networks not based on CoMP). However, the design of beamformers is dynamically coordinated between different serving BSs in order to reduce the intercell interference caused by different transmissions occurring over the same time/frequency resources.

CoMP operation targets many different deployments, including coordination between sites and sectors in cellular macro deployments, as well as different configurations of so-called heterogeneous deployments, where for instance a macro radio access network node coordinates the transmission/reception with pico radio access network nodes within the macro coverage area. The coordination can be either distributed, by means of direct communication between the different radio access network nodes, or centralized, by using a central coordinating network node.

In the current state-of-the-art, the intercell interference suppression at each BS may be achieved by designing the beamformers such that the intercell interference leakage over the interfering CSI channel becomes as small as possible. In general terms, controlling the intercell interference in this way relies highly on the availability of accurate knowledge of both desired and interfering CSI matrices from all UEs in the network at each BS.

In practice, CSI acquisition at the BSs might require several phases such as training, estimation, feedback, and exchange over backhaul. In some scenarios such as high-speed UEs, the CSI changes too fast to be estimated or predicted accurately. Even when the CSI estimation/prediction is accurate, the impairments in the feedback/backhaul links (error, delay, etc.) can severely degrade the quality of the acquired CSI. With erroneous CSI, each BS designs its beamformer to mitigate the intercell interference over erroneous channels (instead of the true channels) and hence might result in severe interference leakage over the true channels.

Hence, there is still a need for an improved coordination of transmission from BSs in order to mitigate intercell interference leakage.

SUMMARY

An object of embodiments herein is to provide efficient coordination of transmission from BSs in order to mitigate intercell interference leakage.

The inventors of the enclosed embodiments have through a combination of practical experimentation and theoretical derivation discovered that it may to be desirable to utilize coordination techniques that are more robust to (or even independent of) CSI impairments for successful operation of coordination techniques in a plurality of scenarios.

A particular object is therefore to provide efficient feedback-less coordination of transmission from BSs in order to mitigate intercell interference leakage.

According to a first aspect there is presented a method for scheduled transmission from at least two network devices in a cellular communications network. The method is performed by a scheduling provider network entity. The method comprises determining a beamforming pattern for the at least two network devices according to which concurrent received power from all but one of the at least two network devices in sectors in which more than one network device is enabled to transmit using directional transmission beams is below a threshold interference power level. The method comprises providing information of the beamforming pattern to the at least two network devices.

Advantageously this provides efficient coordination of transmission from BSs in order to mitigate intercell interference leakage.

Advantageously this provides efficient feedback-less coordination of transmission from BSs in order to mitigate intercell interference leakage.

Advantageously, this enables intercell interference suppression to be achieved by changing the direction of the main beam at each network device according to a predetermined pattern. Hence, contrary to conventional intercell interference suppression techniques that are based on instantaneous CSI, the network devices do not require explicit and frequent feedback/exchange of CSI from portable wireless devices.

Advantageously, this is particularly useful for scenarios when CSI acquisition is not possible due to e.g., high speed of portable wireless devices, and in the presence of large errors, and/or delays, in the feedback and backhaul links, etc.

According to a second aspect there is presented a scheduling provider network entity for scheduled transmission from at least two network devices in a cellular communications network. The scheduling provider network entity comprises a processing unit. The processing unit is configured to determine a beamforming pattern for the at least two network devices according to which concurrent received power from all but one of the at least two network devices in sectors in which more than one network device is enabled to transmit using directional transmission beams is below a threshold interference power level. The processing unit is configured to provide information of the beamforming pattern to the at least two network devices.

According to a third aspect there is presented a computer program for scheduled transmission from at least two network devices in a cellular communications network, the computer program comprising computer program code which, when run on a processing unit of a scheduling provider network entity, causes the scheduling provider network entity to perform a method according to the first aspect.

According to a fourth aspect there is presented a method for scheduled transmission in a cellular communications network. The method is performed by a network device operable to transmit in sectors using directional transmission beams. The method comprises acquiring information of a beamforming pattern from a scheduling provider network entity as determined according to the first aspect 1. The method comprises transmitting using said directional transmission beams in said sectors according to said beamforming pattern.

According to a fifth aspect there is presented a network device for scheduled transmission in a cellular communications network. The network device is operable to transmit in sectors using directional transmission beams. The network device comprises a processing unit. The processing unit is configured to acquire information of a beamforming pattern from a scheduling provider network entity as determined according to the second aspect. The processing unit is configured to transmit using the directional transmission beams in said sectors according to said beamforming pattern.

According to a sixth aspect there is presented a computer program for scheduled transmission in a cellular communications network, the computer program comprising computer program code which, when run on a processing unit of a network device, causes the network device to perform a method according to the fourth aspect.

According to a seventh aspect there is presented a computer program product comprising a computer program according to at least one of the third aspect and the sixth aspect and a computer readable means on which the computer program is stored.

According to an eight aspect there is presented a system for scheduled transmission from at least two network devices in a cellular communications network. The system comprises at least two network devices. Each respective network device is configured to transmit in sectors using directional transmission beams. The at least two network devices are configured to transmit in the sectors according to a beamforming pattern according to which concurrent received power from all but one of the at least two network devices in sectors in which more than one network device is enabled to transmit using the directional transmission beams is below a threshold interference power level.

It is to be noted that any feature of the first, second, third, fourth, fifth, sixth, seventh, and eight aspects may be applied to any other aspect, wherever appropriate. Likewise, any advantage of the first aspect may equally apply to the second, third, fourth, fifth, sixth, seventh, and/or eight aspect, respectively, and vice versa. Other objectives, features and advantages of the enclosed embodiments will be apparent from the following detailed disclosure, from the attached dependent claims as well as from the drawings.

to Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The embodiments disclosed herein relate to spatial intercell interference mitigation in wireless networks when acquiring accurate knowledge about the propagation environment is impossible. Particularly, the embodiments disclosed herein relate to mechanisms for scheduled transmission from at least two network devices 11a, 11b, 11c in a cellular communications network 10a, 10b, 10c, 10d. In order to obtain such scheduled transmission there is provided a scheduler providing network entity, a method performed by the scheduler providing network entity, a computer program comprising code, for example in the form of a computer program product, that when run on a processing unit of the scheduler providing network entity, causes the scheduler providing network entity to perform the method. In order to obtain such scheduled transmission there is further provided a network device, a method performed by the network device, a computer program comprising code, for example in the form of a computer program product, that when run on a processing unit of the network device, causes the network device to perform the method. In order to obtain such scheduled transmission there is further provided a system comprising at least two network devices.

Figure 15:
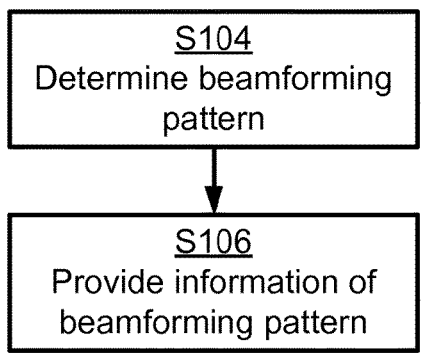
FIGS. 15 to 17 are flowcharts of methods according to embodiments.
Figure 17:
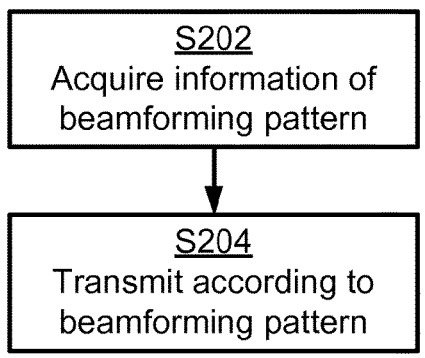
Figure 16:
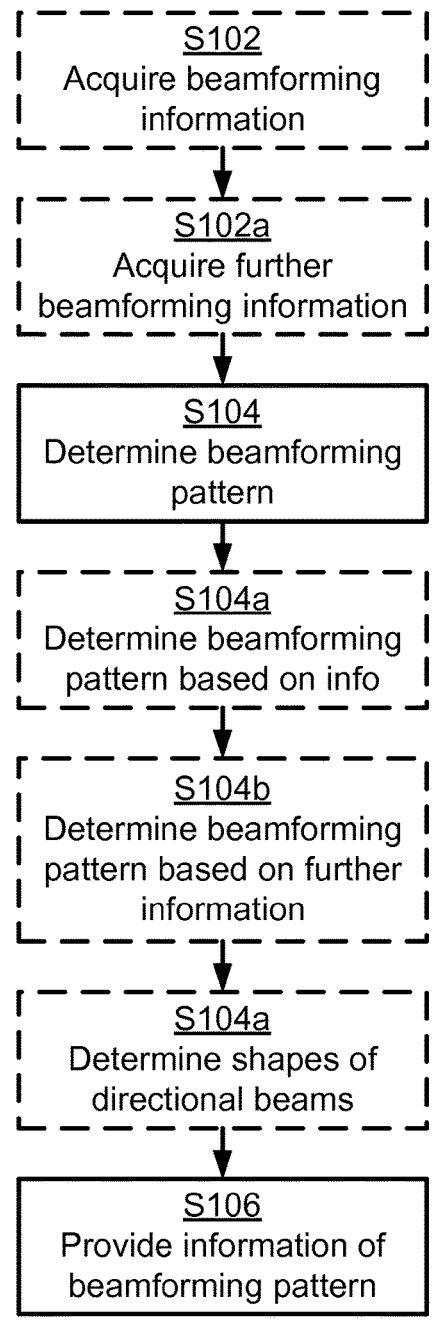

FIGS. 15 and 16 are flow chart illustrating embodiments of methods for scheduled transmission from at least two network devices 11a, 11b, 11c in a cellular communications network 10a, 10b, 10c, 10d as performed by the scheduler providing network entity. FIG. 17 is a flow chart illustrating an embodiment of a method for scheduled transmission from at least two network devices 11a, 11b, 11c in a cellular communications network 10a, 10b, 10c, 10d as performed by the network device. The methods are advantageously provided as computer programs 332a, 332b. Detailed descriptions of each step in FIGS. 15-17 will follow below.

At least some of the embodiments disclosed herein relate to mechanisms which may be applied at network devices such as radio access network nodes in order to suppress the intercell interference experienced by portable wireless devices with the lowest SINR. At least some of the embodiments disclosed herein are based on employing a set of pre-determined coordinated beamforming patterns at the radio access network nodes such that in any pattern each radio access network node serves a certain sector of its own cell by directing its main beam towards that sector. These sectors together with their corresponding serving beam directions are chosen coordinatively such that the interference caused to the worst-case portable wireless devices (i.e., those with the minimum SINR) from the neighboring radio access network nodes, is minimized. As a bonus, the signal strength is also increased for the served devices by directing the serving beam towards them; i.e. the SINR is increased both in numerator and denominator. A scheduler providing network entity may be employed to fairly share the available resources among the served sectors in different patterns.

Reference is now made to FIG. 15 illustrating a method for scheduled transmission from at least two network devices 11a, 11b, 11c in a cellular communications network 10a, 10b, 10c, 10d as performed by a scheduler providing network entity 13a, 13b, 13c according to an embodiment.

The scheduler providing network entity 13a, 13b, 13c is configured to, in a step S104, determine a beamforming pattern for at least two network devices 11a, 11b, 11c according to which concurrent received power from all but one of the at least two network devices in sectors 12a, 12b in which more than one network device 11a, 11b, 11c is enabled to transmit using directional to transmission beams $w_1^{(1)}, \ldots w_3^{(3)}$ is below a threshold interference power level.

The scheduler providing network entity 13a, 13b, 13c is configured to, in a step S106, provide information of the beamforming pattern to the at least two network devices 11a, 11b, 11c.

Embodiments relating to further details of scheduled transmission from at least two network devices 11a, 11b, 11c in a cellular communications network 10a, 10b, 10c, 10d will now be disclosed. By applying at least some of these embodiments the main beam directions of the network devices 11a, 11b, 11c may be configured such that the interference caused to at least some wireless devices are reduced. By applying at least some of these embodiments the main beam directions of the network devices 11a, 11b, 11c may be configured such that even the interference caused to the worst-case wireless device is minimized.

There may be different ways to determine the threshold interference power level. Different embodiments relating thereto will now be described in turn. For example, the threshold interference power level corresponds to a threshold SINR in said sectors. For example, the beamforming pattern may be determined such that concurrent transmission from at most one of the network devices is allowed for each overlapping sector. For example, the threshold interference power level may correspond to zero received power in the overlapping sector. This will be the case where all but one network device do not transmit in the sector at the time of measuring the received power in the sector.

There may be different ways to define the sectors. For example, all of the sectors may be part of one cell 12 of the cellular communications network.

Reference is now made to FIG. 16 illustrating methods for scheduled transmission from at least two network devices 11a, 11b, 11c in a cellular communications network 10a, 10b, 10c, 10d as performed by a scheduler providing network entity 13a, 13b, 13c according to further embodiments.

There may be different ways to determine the beamforming pattern. Different to embodiments relating thereto will now be described in turn. For example, the beamforming pattern may be based on beamforming information from the network devices. Sectors in which more than one network device is enabled to transmit using the directional transmission beams may be denoted overlapping sectors. The scheduler providing network entity 13a, 13b, 13c may be configured to, in an optional step S102, acquire beamforming information from the at least two network devices. The beamforming information identifies respective sectors in which each respective network device is configured to transmit using the directional transmission beams. At least one sector of one network device at least partly overlaps with another sector of another network device. The scheduler providing network entity 13a, 13b, 13c may then be configured to, in an optional step S104a, determine the beamforming pattern based on the beamforming information. The beamforming pattern may be determined such that concurrent received power in each overlapping sector from all but one network device is below the threshold interference power level.

Interference may be mitigated via coordinated elevation beamforming. That is, the directional transmission beams may be elevation directional transmission beams. The sectors may then be defined by beamforming in elevation direction of the at least two network devices.

Figure 1:
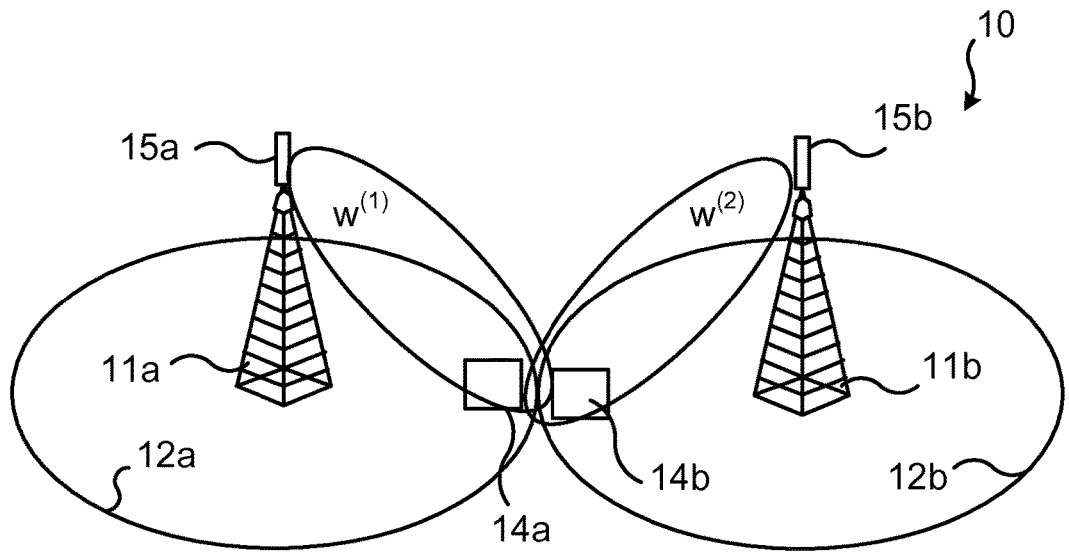
FIG. 1 is a schematic diagram illustrating a cellular communication networks according to prior art.

Consider again the example illustrated in FIG. 1 and consider a scenario in which the antennas of the network devices 11a, 11b are arranged vertically. In such a case, the herein disclosed mechanisms for scheduled transmission from at least two network devices 11a, 11b, 11c in a cellular communications network 10a, 10b, 10c, 10d can be applied in the elevation domain.

Figure 4:
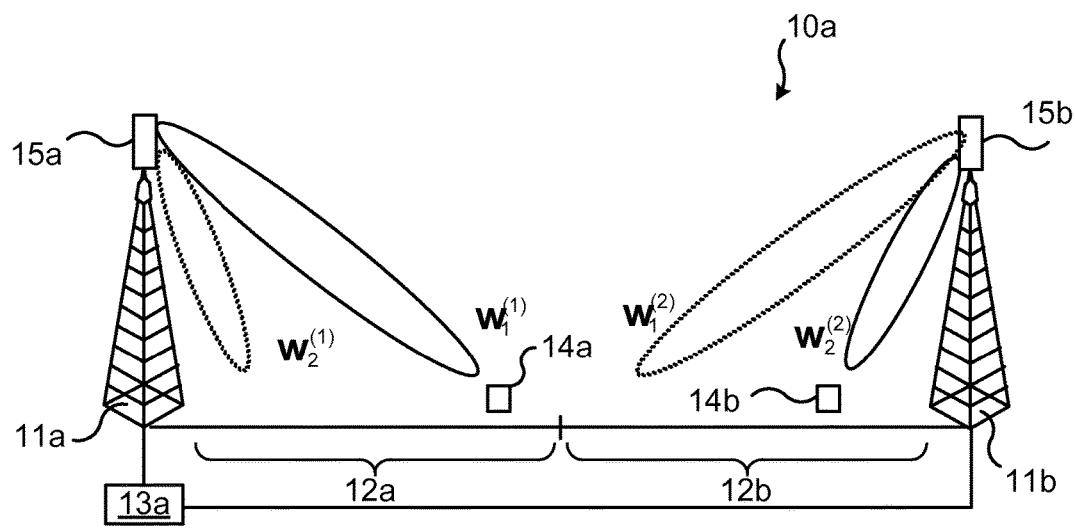
FIGS. 4 to 9 are schematic diagram illustrating cellular communication networks according to embodiments.

Consider now the example illustrated in FIG. 4. FIG. 4 is a schematic illustration of a cellular communications network boa utilizing coordinated elevation beamforming in a two-cell network. Each of the network devices 11a, 11b in FIG. 4 is configured to select one out of two possible beamformers for transmitting to the portable wireless devices 14a, 14b in sectors 12a, 12b using antennas 15a, 15b. This results in the following four possible combinations of beamformer pairs that can be applied jointly at the network devices 11a, 11b $(w_1^{(1)}, w_1^{(2)})$, $(w_2^{(1)}, w_1^{(2)})$, $(w_1^{(1)}, w_2^{(2)})$, and $(w_2^{(1)}, w_2^{(2)})$. One such combination of beamformers is referred to as a network beamformer state. For instance the network beamformer state $(w_1^{(1)}, w_2^{(2)})$ is illustrated by the solid beams in FIG. 4. According to the herein disclosed mechanisms for scheduled transmission from at least two network devices 11a, 11b in a cellular communications network 10a, some of the network beamformer states are not allowed to be applied at the network devices 11a, 11b as they may create (excessive) interference to portable wireless devices (such as the portable wireless device 14a) at the cell boundary in the neighboring sectors.) For example, in FIG. 4 the beamformer pair $(w_1^{(1)}, w_1^{(2)})$ is a non-desired network beamformer state. Applying such a beamformer pair at the network devices 11a, 11b causes the portable wireless devices at the cell boundary to experience a high interference level, unless the transmissions from network devices 11a, 11b are performed on orthogonal time/frequency resources (and also that transmission from the network devices 11a, 11b is received at orthogonal time/frequency resources). Such portable wireless devices are also located at a farther distance from their serving network device (network device 11a for portable wireless device 14a in sector 12a) compared to other portable wireless devices in the sector and hence are subject to a larger propagation loss from their serving network device. Therefore, applying this non-desired network beamformer state will result in a low SINR for the portable wireless devices at the cell boundary and hence should be avoided. The other three network beamformer states (as listed above) can be applied safely. The scheduler providing network entity 13a in FIG. 4 may apply the herein disclosed mechanisms for scheduled transmission in order to inform the network devices 11a, 11b to transmit in beamforming patterns such that the non-desired network beamformer state is not used.

Figure 5:
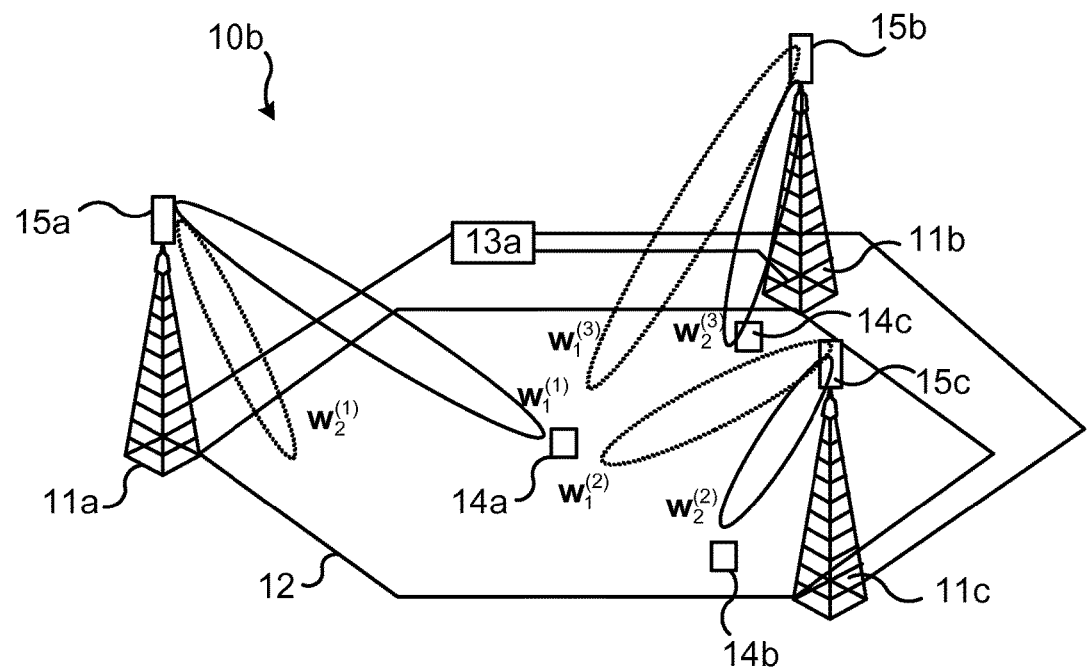

Although only two network devices 11a, 11b were considered in the previous embodiment, the herein disclosed embodiments can be applied to any number of mutually interfering network devices. FIG. 5 is a schematic illustration of coordinated elevation beamforming in a three-cell network. Particularly, FIG. 5 schematically illustrates an example of a cellular communications network 10b having a site with three network devices 11a, 11b, 11c transmitting to portable wireless devices 14a, 14b, 14c by using antennas 15a, 15b, 15c in the cell 12. The three network devices 11a, 11b, 11c are collectively constrained to apply only four network beamformer states: $(w_2^{(1)}, w_2^{(2)}, w_2^{(3)})$, $(w_1^{(1)}, w_2^{(2)}, w_2^{(3)})$, $(w_2^{(1)}, w_1^{(2)}, w_2^{(3)})$, and $(w_2^{(1)}, w_2^{(2)}, w_1^{(3)})$. It is to be noted that in the allowable network beamformer states, at most one network device at a time is using the upper beam to serve the cell boundary portable wireless devices in its own sector. All other possible network beamformer states where more than one network device employing the upper beam is not allowed. Network beamformer state ($w_1^{(1)}$, $w_2^{(2)}$, $w_2^{(3)}$) is in FIG. 5 illustrated using solid lines. The scheduler providing network entity 13a in FIG. 5 may apply the herein disclosed mechanisms for scheduled transmission in order to inform the network devices 11a, 11b, 11c to transmit in beamforming patterns such that non-desired network beamformer states are not used.

The previous embodiments considered beamforming in the elevation domain. The embodiments disclosed herein are, however, not limited to the elevation domain. Interference may additionally or alternatively be mitigated via coordinated azimuth beamforming. That is, the directional transmission beams may be azimuth directional transmission beams. The sectors may then be defined by beamforming in azimuth direction of the at least two network devices.

Figure 6:
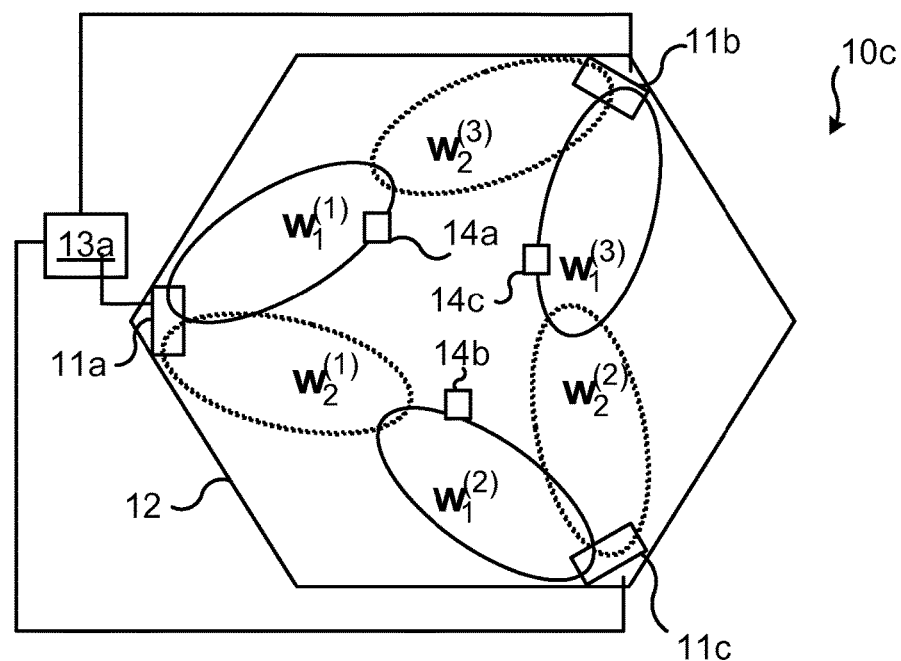

Below an embodiment is presented where the herein disclosed mechanisms for scheduled transmission from at least two network devices 11a, 11b, 11c in a cellular communications network 10a, 10b, 10c, 10d is utilized in the azimuth domain. This requires the antennas of the network devices 11a, 11b, 11c to be arranged horizontally. FIG. 6 is a schematic illustration of a top view to coordinated azimuth beamforming in a three-cell network. Particularly, FIG. 6 schematically illustrates an example of a cellular communications network 10c having a site with three network devices 11a, 11b, 11c transmitting to portable wireless devices 14a, 14b, 14c in the cell 12. Each network device 11a, 11b, 11c is assumed to be configured to, at a given time, apply one out of two possible beamformers. This results in two network beamformer states: ($w_1^{(1)}$, $w_1^{(2)}$, $w_1^{(3)}$) and ($w_2^{(1)}$, $w_2^{(2)}$, $w_2^{(3)}$). The scheduler providing network entity 13a in FIG. 6 may apply the herein disclosed mechanisms for scheduled transmission in order to inform the network devices 11a, 11b, 11c to transmit in beamforming patterns such that non-desired network beamformer states are not used.

Another approach for performance optimization is to apply the disclosed mechanisms for scheduled transmission from at least two network devices 11a, 11b, 11c in a cellular communications network 10a, 10b, 10c, 10d jointly in the azimuth and elevation planes. This may be especially useful in 3-dimensional environments with high rise buildings.

By applying each (allowable) network beamformer state, each network device 11a, 11b, 11c will at a given point in time serve the portable wireless devices in a certain sector of the coverage area. In order to serve all portable wireless devices in the cellular communications network, switching between network beamformer states is required. The switching is carried out according to a predetermined pattern. A list may be kept that indicates when a certain network beamformer state shall be used for a certain set of time/frequency resource elements (TFREs), and when another network beamformer state shall be used for another set of TFREs and so on. This pattern may or may not be updated during run time. Particularly, the scheduler providing network entity 13a, 13b, 13c may be configured to, in an optional step S102a, acquire further beamforming information from the at least two network devices 11a, 11b, 11c; and, in an optional step S104b, determine the beamforming pattern also based on the further beamforming information.

The scheduler providing network entity 13a, 13b, 13c may be configured to optimize/decide which network beamformer state the network devices 11a, 11b, 11c shall use, and hence possibly switch to, for a certain set of TFREs. In the following, an embodiment is provided to illustrate how the available TFREs may be shared among different network beamformer states.

For example, the beamforming pattern may be determined by optimizing a utility function of achievable throughput in at least each overlapping sector.

The beamforming pattern to be optimized may relate to which network beamformer states that shall be used and/or how long runtime to spend in each network beamformer state. The beamforming pattern may be determined by optimizing a utility function of achievable throughput in all sectors of the at least two network devices 11a, 11b, 11c. Additionally or alternatively, the beamforming pattern may be determined according to a proportional fairness scheduling parameter.

Figure 7:
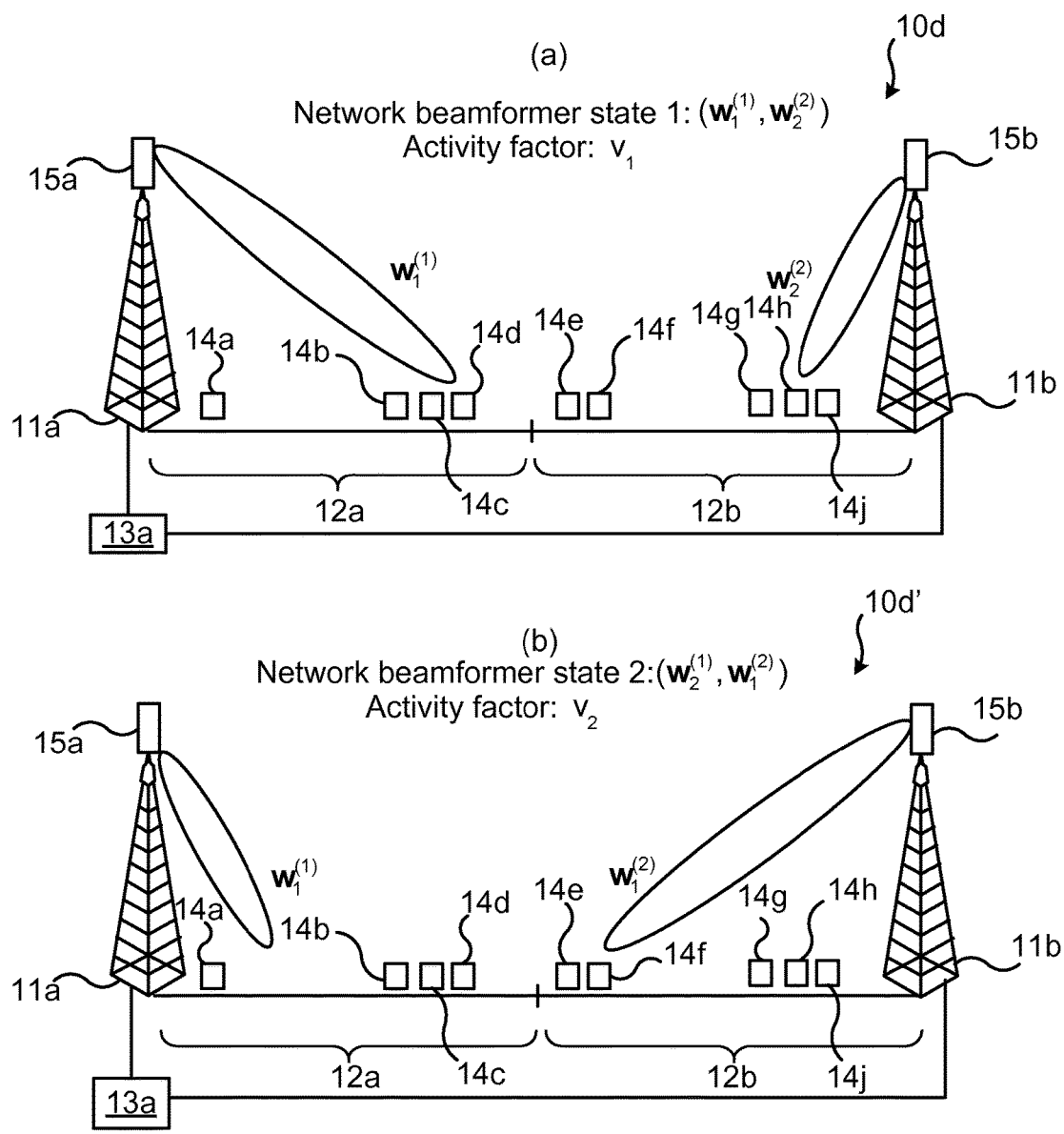

FIGS. 7(a) and (b) provide schematic illustrations of two desired network beamformer states (network beamformer state 1 and network beamformer state 2, respectively) each serving specific portable wireless devices in each sector. Each of the network devices 11a, 11b in FIGS. 7(a) and (b) is configured to select one out of two possible beamformers for transmitting to the portable wireless devices 14a-14j in sectors 12a, 12b using antennas 15a, 15b. Let $K^{(j)}$ denote the set of portable wireless devices that are served by network device j (i.e., by one of the network devices 11a and 11b). The desired network beamformer states are indexed as i=1, 2. Moreover, $K_i^{(j)}$ is the set of users served by network device j when network beamformer state i is applied. The activity factor $v_i$ ($0 \le v_i \le 1$) of network beamformer state i is defined to be the fraction of total TFREs allocated to this beamformer state, such that $$\sum_{i=1}^{2} v_i = 1.$$

Let $R_k^{(j)}$ denote the achievable throughput of portable wireless device k served by network device j, and let $R_{k,i}^{(j)}$ denote the throughput of portable wireless device k served by network device j assuming all TFREs are allocated to the network beamformer state i with which this portable wireless device is served. Then the relation between $R_k^{(j)}$ and $R_{k,i}^{(j)}$ can be expressed as $R_k^{(j)} = v_i R_{k,i}^{(j)}$.

One resource allocation criterion is to maximize some concave and component-wise non-decreasing utility function of portable wireless devices achievable throughput with some suitable notion of fairness, see for example "Fair end-to-end window-based congestion control," by J. Mo and J. Walrand in IEEE/ACM Transactions on Networking, vol. 8, no. 5, pp.556, 567, October 2000, doi: 10.1109/90.879343). Using this approach, to determine $\{v_i\}_{i=1}^2$, the following optimization problem needs to be solved:

$$\text{maximize } g(\bar{R}) \text{ subject to } \sum_{i=1}^{2} v_i \le 1, v_i \ge 0. \quad (3)$$

In (3), $g(\cdot)$ is a desired utility function reflecting some suitable notion of fairness. In addition, R is the vector of all throughputs $\{R_k^{(j)}\}_{\forall k,j}$ of all portable wireless devices in the sector. Assuming $\{R_{k,i}^{(j)}\}_{\forall k,j}$ are known, the optimization problem in (3) can be solved efficiently for any concave and component-wise non-decreasing utility function using standard optimization methods.

As an example embodiment of the utility function, proportional fairness scheduling is considered whose utility function is given as $$g(R) = \sum_{\forall k, i} \log(v_i R_{k,i}^{(j)}) \quad (4)$$

The Lagrangian for the optimization problem in (3) may be written as $$L(v, u) = \sum_{\forall k, i} \log(v_i R_{k,i}^{(j)}) + \sum_{i=1}^{2} u_i v_i - u_0 \left( \sum_{i=1}^{2} v_i - 1 \right)$$

Taking the stationary condition of the Karush-Kuhn-Tucker (KKT) conditions, see "Convex Optimization," by S. Boyd and L. Vandenberghe, Cambridge University Press, New York, N.Y., USA. 2004, the following expressions are obtained:

$$\nabla_{v_i} L(v, u, \mu) = \frac{|K_i^{(1)}|}{v_i} + \frac{|K_i^{(2)}|}{v_i} + u_i - u_0 = 0$$

$$u_i = u_0 - \frac{|K_i^{(1)}| + |K_i^{(2)}|}{v_i}$$

Since $$\frac{|K_i^{(1)}| + |K_i^{(2)}|}{v_i} > 0,$$

it results that $u_0 > u_i$ and hence $u_0 > 0$. From the complementary slackness condition of KKT conditions the following is obtained:

$$u_0 \left( \sum_{i=1}^{2} v_i - 1 \right) = 0$$

$$u_i v_i = 0$$

Since $u_0 > 0$, the solution boils down to solving the following equations:

$$v_1 + v_2 = 1$$

$$\left( u_0 - \frac{|K_1^{(1)}| + |K_1^{(2)}|}{v_1} \right) v_1 = 0$$

$$\left( u_0 - \frac{|K_2^{(1)}| + |K_2^{(2)}|}{v_2} \right) v_2 = 0$$

Solving these equations yields:

$$v_i = \frac{|K_i^{(1)}| + |K_i^{(2)}|}{|K^{(1)}| + |K^{(2)}|}$$

which means that $v_i$ is simply the ratio of the number of users in the sector area served by network beamformer state i to the total number of portable wireless devices in the coverage area.

Figure 8:
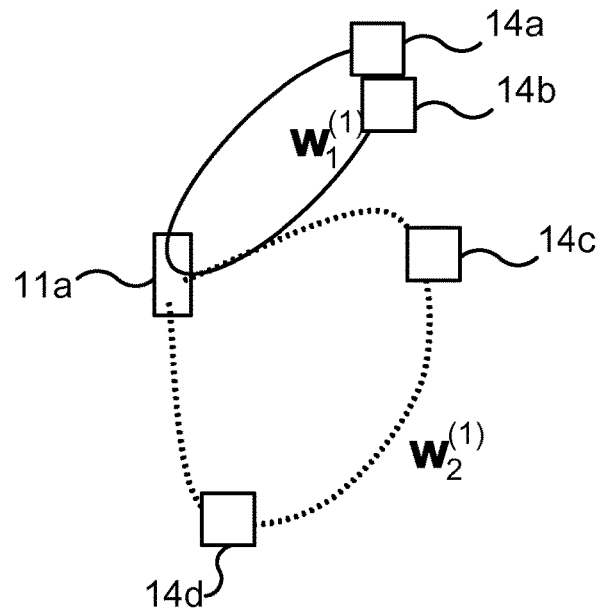

Further performance improvement may be obtained by optimizing the beam shapes via properly choosing the beamformers. FIG. 8 gives a schematic illustration of an example according to which there is a need to use different beam shapes. The network device 11a in FIG. 8 is configured to select one out of two possible beamformers for transmitting to the portable wireless devices 14a-14d. Particularly, the beamforming information may comprise shape information of the directional transmission beams. Then at least two directional transmission beams of one network device may have different shapes. The scheduler providing network entity 13a, 13b, 13c may be configured to, in an optional step S104c, determine shapes of the directional transmission beams. FIG. 8 schematically illustrates a situation in which the portable wireless devices 14a, 14b served by beamformer $w_1^{(1)}$ are located close to each other, whilst the portable wireless devices 14c, 14d served by beamformer $w_2^{(1)}$ are placed at a farther distance from each other. The network device 11a is configured to in such a situation adapt its beam width by properly choosing the beamformers.

Figure 9:
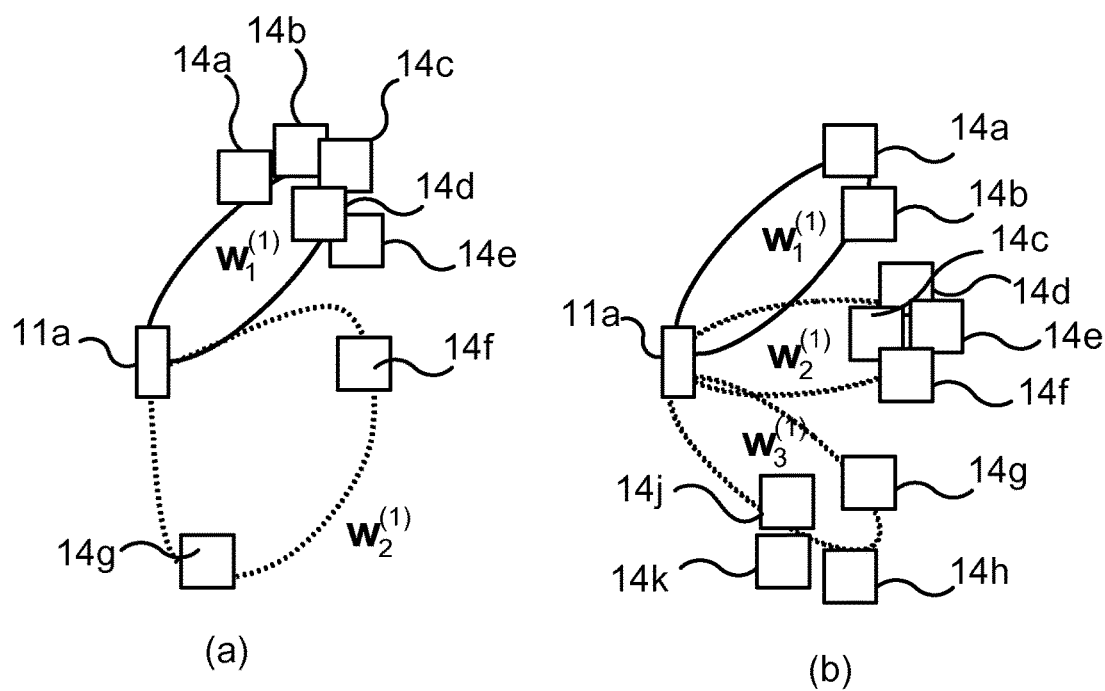

Further performance improvement may be obtained by adapting the number of beams at each network device 11a, 11b, 11c, in addition to the beam shapes, according to the density of traffic or density of portable wireless devices in different sectors. FIGS. 9(a) and (b) provide a schematic illustration of two different traffic situations and represents an example where there is a need to adapt the number of beams. The network device 11a in 9(a) is configured to select one out of two possible beamformers for transmitting to the portable wireless devices 14a-14g. The network device 11a in 9(b) is configured to select one out of three possible beamformers for transmitting to the portable wireless devices 14a-14k. FIG. 9(a) shows a scenario with low density in one sector comprising portable wireless devices 14f and 14g and high density in one sector comprising portable wireless devices 14a, 14c, 14d and 14e. In this case the network device 11a can use a wide beam to cover the low density sector and a narrow beam to serve the high density sector. FIG. 9(b) shows a high density scenario where it is better to use three beams to serve different sectors in order to provide network coverage to the portable wireless devices 14a-k.

Although one scheduler providing network entity 13a thus far has been illustrated to determine scheduled transmission in a cellular communications network 10a, 10b, 10c, 10d, the herein disclosed embodiments are also applicable to scenarios where more than one scheduler providing network entity 13a, 13b, 13c are configured to jointly or in a distributive manner determine such scheduled transmission in a cellular communications network 10a, 10b, 10c, 10d. For example, each network device 11a, 11b, 11c may implement at least part of the functionality of the scheduler providing network entity 13a. Thus each network device 11a, 11b, 11c may be associated with its own scheduler providing network entity 13a, 13b, 13c.

Reference is now made to FIG. 17 illustrating a method for scheduled transmission in a cellular communications network 10a, 10b, 10c, 10d as performed by a network device 11a, 11b, 11c according to an embodiment. The network device 11a, 11b, 11c is operable to transmit in sectors using directional transmission beams $w_1^{(1)}, \ldots, w_3^{(1)}$.

The network device 11a, 11b, 11c is configured to, in a step S202, acquire information of a beamforming pattern from a scheduler providing network entity 13a, 13b, 13c as determined according to any one of the above disclosed embodiments. The network device 11a, 11b, 11c is configured to, in a step S204, transmit using the directional transmission beams in the sectors according to the beamforming pattern.

A system for scheduled transmission from at least two network devices 11a, 11b, 11c in a cellular communications network 10a, 10b, 10c, 10d may comprise at least two network devices 11a, 11b, 11c. Each respective network to device 11a, 11b, 11c may be configured to transmit in sectors using directional transmission beams $w_1^{(1)}, \ldots, w_3^{(3)}$. At least two of the network devices 11a, 11b, 11c may be configured to transmit in the sectors 12a, 12b according to a beamforming pattern according to which concurrent received power from all but one of the at least two network devices in sectors in which more than one network device is enabled to transmit using the directional transmission beams is below a threshold interference power level.

The at least two network devices may be configured to receive information of the beamforming pattern from a scheduler providing network entity 13a, 13b, 13c as determined according to any one of the above disclosed embodiments. The network device 11a, 11b, 11c may additionally or alternatively be configured to, determine the beamforming pattern among themselves. Hence, at least some of the network device 11a, 11b, 11c may implement the functionality of the scheduler providing network entity 13a, 13b, 13c.

The embodiments presented herein are not necessarily limited to any particular kind of cellular communications network. The cellular communications network 10a, 10b, 10c, 10d may, for example, be a Global System for Mobile communications (GSM) network, a Wideband Code Division Multiple Access (WCDMA) network, a Worldwide Interoperability for Microwave Access (WiMax) network, or a Long-Term Evolution (LTE) network.

Figure 10:
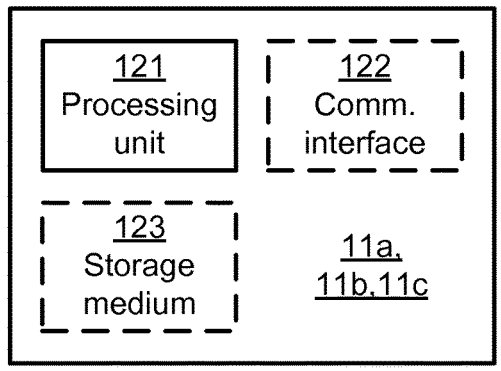
FIG. 10 is a schematic diagram showing functional units of a network device according to an embodiment.

FIG. 10 schematically illustrates, in terms of a number of functional units, the components of a network device 11a, 11b, 11c according to an embodiment. A processing unit 121 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 331b (as in FIG. 14), e.g. in the form of a storage medium 123. Thus the processing unit 121 is thereby arranged to execute methods as herein disclosed. The storage medium 123 may also comprise persistent storage, which, for example, can be any single one or combination of magnetic memory, optical memory, solid state memory or even remotely mounted memory. The network device 11a, 11b, 11c may further comprise a communications interface 122 for communications with at least one other network device 11a, 11b, 11c, at least one portable wireless device 14a-k, and a scheduler providing network entity 13a, 13b, 13c. As such the communications interface 22 may comprise one or more transmitters and receivers, comprising analogue and digital components and a suitable number of antennas for radio communications as well as ports and interfaces for wired communications. The processing unit 121 controls the general operation of the network device 11a, 11b, 11c e.g. by sending data and control signals to the communications interface 122 and the storage medium 123, by receiving data and reports from the communications interface 122, and by retrieving data and instructions from the storage medium 123. Other components, as well as the related functionality, of the network device 11a, 11b, 11c are omitted in order not to obscure the concepts presented herein.

Figure 2:
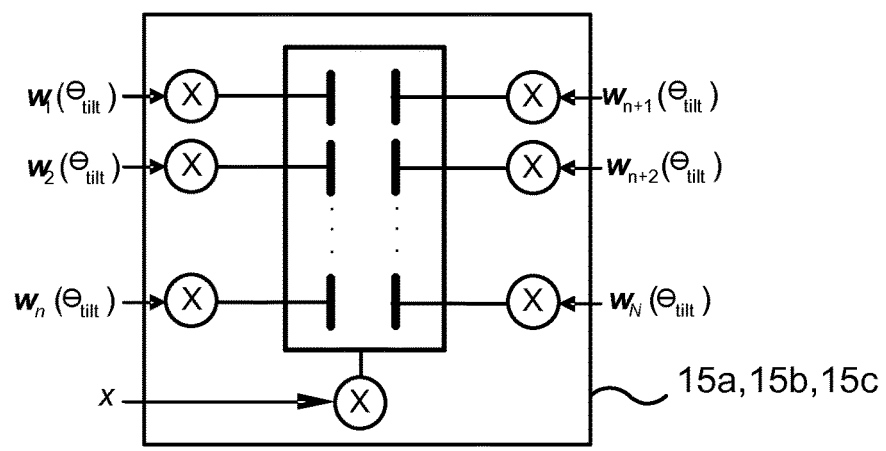
FIG. 2 is a schematic diagram of a known antenna array.
Figure 3:
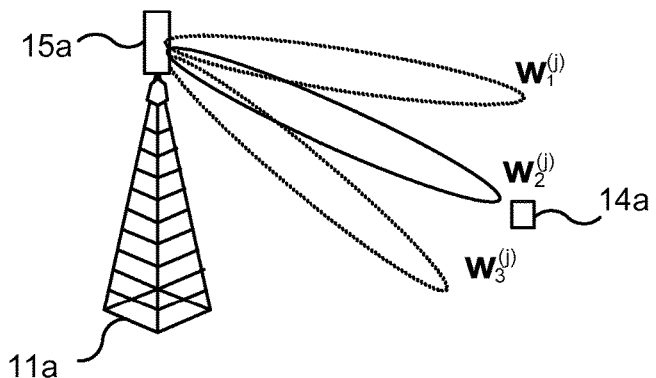
FIG. 3 is a schematic diagram of a known network device.
Figure 11:
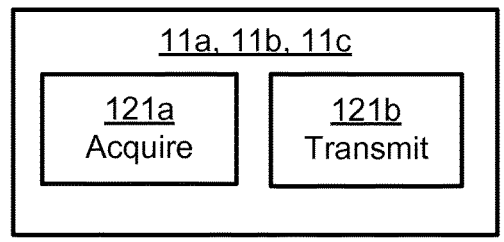
FIG. 11 is a schematic diagram showing functional modules of a network device according to an embodiment.

FIG. 11 schematically illustrates, in terms of a number of functional modules, the components of a network device 11a, 11b, 11c according to an embodiment. The network device 11a, 11b, 11c of FIG. 2b comprises a number of functional modules such as an acquire module 121a and a transmit module 121b. The network device 11a, 11b, 11c of FIG. 11 may further comprises a number of optional functional modules. In general terms, each functional module 121a-b may be implemented in hardware or in software. Preferably, one or more or all functional modules 121a-b may be implemented by the processing unit 121, possibly in cooperation with functional units 122 and/or 123. The processing unit 121 may thus be arranged to from the storage medium 123 fetch instructions as provided by a functional module 121a-b and to execute these instructions, thereby performing any of the above disclosed steps of the network device 11a, 11b, 11c.

Figure 12:
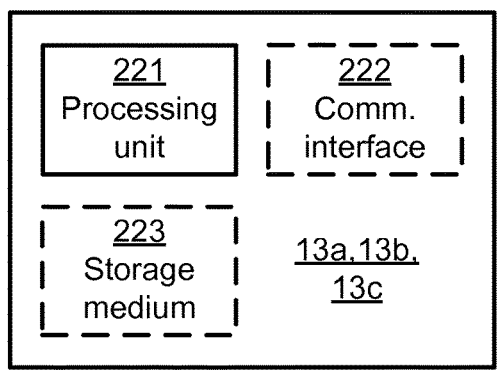
FIG. 12 is a schematic diagram showing functional units of a scheduler providing network entity according to an embodiment.

FIG. 12 schematically illustrates, in terms of a number of functional units, the components of a scheduler providing network entity 13a, 13b, 13c according to an embodiment. A processing unit 221 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 331a (as in FIG. 14), e.g. in the form of a storage medium 223. Thus the processing unit 221 is thereby arranged to execute methods as herein disclosed. The storage medium 223 may also comprise persistent storage, which, for example, can be any single one or combination of magnetic memory, optical memory, solid state memory or even remotely mounted memory. The scheduler providing network entity 13a, 13b, 13c may further comprise a communications interface 222 for communications with at least one network device 11a, 11b, 11c, and/or another scheduler providing network entity 13a, 13b, 13c. As such the communications interface 22 may comprise one or more transmitters and receivers, comprising analogue and digital components and a suitable number of antennas for radio communications as well as ports and interfaces for wired communications. The processing unit 221 controls the general operation of the scheduler providing network entity 13a, 13b, 13c e.g. by sending data and control signals to the communications interface 222 and the storage medium 223, by receiving data and reports from the communications interface 222, and by retrieving data and instructions from the storage medium 223. Other components, as well as the related functionality, of the scheduler providing network entity 13a, 13b, 13c are omitted in order not to obscure the concepts presented herein.

Figure 13:
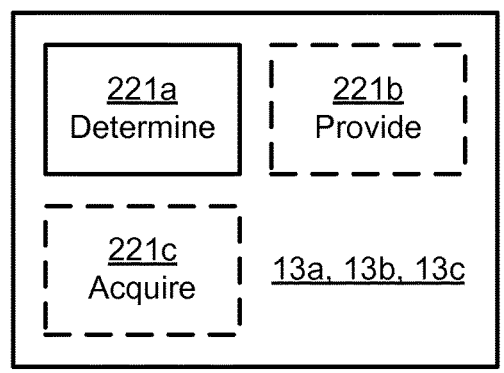
FIG. 13 is a schematic diagram showing functional modules of a scheduler providing network entity according to an embodiment.

FIG. 13 schematically illustrates, in terms of a number of functional modules, the components of a scheduler providing network entity 13a, 13b, 13c according to an embodiment. The scheduler providing network entity 13a, 13b, 13c of FIG. 13 comprises a number of functional modules such as a determine module 221a. The scheduler providing network entity 13a, 13b, 13c of FIG. 13 may further comprises a number of optional functional modules, such as any of a provide module 221*b*, and an acquire module 221*c*. In general terms, each functional module 221*a-c* may be implemented in hardware or in software. Preferably, one or more or all functional modules 221*a-c* may be implemented by the processing unit 221, possibly in cooperation with functional units 222 and/or 223. The processing unit 221 may thus be arranged to from the storage medium 223 fetch instructions as provided by a functional module 221*a-c* and to execute these instructions, thereby performing any of the above disclosed steps of the scheduler providing network entity 13*a*, 13*b*, 13*c*.

The scheduler providing network entity 13*a*, 13*b*, 13*c* may be provided as a standalone device or as a part of a further device. For example, the scheduler providing network entity 13*a*, 13*b*, 13*c* may be provided in a network device 11*a*, 11*b*, 11*c*. The scheduler providing network entity 13*a*, 13*b*, 13*c* may be provided as an integral part of the network device 11*a*, 11*b*, 11*c*. That is, the components of the scheduler providing network entity 13*a*, 13*b*, 13*c* may be integrated with other components of network device 11*a*, 11*b*, 11*c*; some components of the scheduler providing network entity 13*a*, 13*b*, 13*c* and the network device 11*a*, 11*b*, 11*c* may be shared. For example, if the network device 11*a*, 11*b*, 11*c* as such comprises a processing unit 121, this processing unit may be arranged to perform the actions of the processing unit 221 of the scheduler providing network entity 13*a*, 13*b*, 13*c*. Alternatively the scheduler providing network entity 13*a*, 13*b*, 13*c* may be provided as a separate unit in the network device 11*a*, 11*b*, 11*c*.

Figure 14:
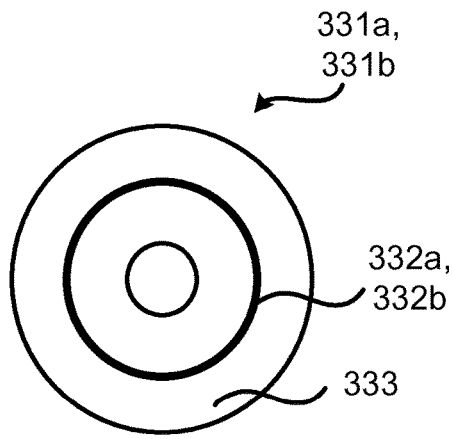
FIG. 14 shows one example of a computer program product comprising computer readable means according to an embodiment.

FIG. 14 shows one example of a computer program product 331*a*, 331*b* comprising computer readable means 333. On this computer readable means 333, a computer program 332*a* can be stored, which computer program 332*a* can cause the processing unit 121 and thereto operatively coupled entities and devices, such as the communications interface 122 and the storage medium 123, to execute, possible by interacting with functional modules 121*a*-121*c*, methods according to embodiments described herein. On this computer readable means 333, a computer program 332*b* can be stored, which computer program 332*b* can cause the processing unit 221 and thereto operatively coupled entities and devices, such as the communications interface 222 and the storage medium 223, to execute, possible by interacting with functional modules 221*a*-221*c*, methods according to embodiments described herein. The computer programs 332*a*, 332*b* and/or computer program products 331*a*, 331*b* may thus provide means for performing any steps as herein disclosed.

In the example of FIG. 14, the computer program product 331*a*, 331*b* is illustrated as an optical disc, such as a CD (compact disc) or a DVD (digital versatile disc) or a Blu-Ray disc. The computer program product 331*a*, 331*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer programs 332*a*, 332*b* are here schematically shown as a track on the depicted optical disk, the computer programs 332*a*, 332*b* can be stored in any way which is suitable for the computer program product 331*a*, 331*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

For example, the network devices have been exemplified as radio access network nodes (such as radio base station; base transceiver station; node B, evolved node B). For example the network devices have been exemplified as providing coverage to portable wireless devices (such as mobile stations, mobile phones, handsets, wireless local loop phones, user equipment (UE), smartphones, laptop computers, tablet computers).

The invention claimed is:

1. A method for scheduling transmission from a plurality of network nodes, the plurality of network nodes comprising a first network node and a second network node, the method comprising:

acquiring, by a network entity comprising a processor, a memory, and one or more of a transmitter and a receiver, first beamforming information from the first network node, the first beamforming information indicating a first set of spatial sectors within which the first network node is configured to transmit using a first set of directional beams, the first set of directional beams comprising at least a first directional beam;

acquiring, by the network entity, second beamforming information from the second network node, the second beamforming information indicating a second set of spatial sectors within which the second network node is configured to transmit using a second set of directional beams, the second set of directional beams comprising at least a second directional beam;

based on at least the first beamforming information and the second beamforming information, determining that the first network node and the second network node are configured to transmit within an overlapping sector;

based on at least the first beamforming information and the second beamforming information, determining, by the network entity, a beamforming pattern for the plurality of network nodes according to which concurrent received power from all but one of the plurality of network nodes is below a threshold interference power level in the overlapping sector, the beamforming pattern comprising (i) a first indication for the first network node to transmit using the first directional beam, and (ii) a second indication for the second network node to transmit using the second directional beam, wherein determining the beamforming pattern comprises:

determining, based on the first beamforming information, a first plurality of available directional beams with which the first network node is configured to transmit, the first plurality of available directional beams comprising at least a first directional beam and a second directional beam, each directional beam of the first plurality of available directional beams being configured to transmit within a respective spatial sector;

determining, based on the second beamforming information, a second plurality of available directional beams with which the second network node is configured to transmit, the second plurality of available directional beams comprising at least a third directional beam and a fourth directional beam, each directional beam of the second plurality of available directional beams being configured to transmit within a respective spatial sector;

based on at least the first plurality of available directional beams and the second plurality of available directional beams, determining, by the network entity, a plurality of possible beamformer states comprising at least a first beamformer state and a second beamformer state, the first beamformer state indicating use of at least the first directional beam by the first network node and the third directional beam by the second network node, the second beamforming state indicating use by the first network node of at least the second directional beam instead of the first directional beam and use by the second network node of at least the fourth directional beam instead of the third directional beam;

determining, by the network entity, a set of non-desired beamformer states;

defining, by the network entity, the beamforming pattern by selecting at least one of the possible beamformer states that is not among the set of non-desired beamformer states;

transmitting to the first network node a first instruction to transmit according to the determined beamforming pattern; and transmitting to the second network node a second instruction to transmit according to the determined beamforming pattern.

2. The method of claim 1, wherein said threshold interference power level corresponds to a threshold signal to interference and noise ratio, SINR, in said sectors.

3. The method of claim 1, further comprising:
acquiring further beamforming information from said at least two network nodes; and
determining said beamforming pattern also based on said further beamforming information.

4. The method of claim 1, wherein said beamforming pattern is determined such that concurrent transmission from at most one of the network nodes is allowed for each overlapping sector.

5. The method of claim 1, wherein said threshold interference power level corresponds to zero received power in said overlapping sector.

6. The method of claim 1, wherein all of said sectors are part of one cell of the cellular communications network.

7. The of claim 1, wherein said directional transmission beams are elevation directional transmission beams.

8. The method of claim 7, wherein the sectors are defined by beamforming in elevation direction of the at least two network devices.

9. The method of claim 1, wherein said directional transmission beams are azimuth directional transmission beams.

10. The method of claim 9, wherein the sectors are defined by beamforming in azimuth direction of the at least two network devices.

11. The method of claim 2, wherein said beamforming information comprises shape information of said directional transmission beams.

12. The method of claim 11, wherein at least two directional transmission beams of the first network node have different shapes.

13. The method of claim 12, wherein determining said beamforming pattern further comprises:
determining shapes of said directional transmission beams.

14. The method of claim 1, wherein said beamforming pattern is determined by optimizing a utility function of achievable throughput in at least each overlapping sector.

15. The method of claim 1, wherein said beamforming pattern is determined by optimizing a utility function of achievable throughput in all sectors of the at least two network devices.

16. The method of claim 1, wherein said beamforming pattern is determined according to a proportional fairness scheduling parameter.

17. The method of claim 1, wherein the cellular communications network is any of a Global System for Mobile communications, GSM, a Wideband Code Division Multiple Access, WCDMA, network, a Worldwide Interoperability for Microwave Access, WiMax, network, or a Long-Term Evolution, LTE, network.

18. The method of claim 1, further comprising:
receiving, at the first network node, the first instruction to transmit according to the determined beamforming pattern; and
transmitting, using a directional transmission beam of the first network node, in said overlapping sector according to said beamforming pattern.

19. The method of claim 1, wherein the beamforming pattern is defined by selecting, by the network entity, multiple of the possible beamformer states that are not among the set of non-desired beamformer states, the pattern specifying that the selected beamformer states will be switched between over time.

20. A network entity for scheduling transmission among a plurality of network nodes, the plurality of network nodes comprising a first network node and a second network node, the network entity comprising:
a memory; and
a processor configured to execute instructions, the network entity being configured to:
acquire first beamforming information from the first network node, the first beamforming information indicating a first set of spatial sectors within which the first network node is configured to transmit using a first set of directional beams, the first set of directional beams comprising at least a first directional beam;
acquire second beamforming information from the second network node, the second beamforming information indicating a second set of spatial sectors within which the second network node is configured to transmit using a second set of directional beams, the second set of directional beams comprising at least a second directional beam;
based on at least the first beamforming information and the second beamforming information, determine that the first network node and the second network node are configured to transmit within an overlapping sector;
based on at least the first beamforming information and the second beamforming information, determine a beamforming pattern for the plurality of network nodes according to which concurrent received power from all but one of the plurality of network nodes is below a threshold interference power level in the overlapping sector, the beamforming pattern comprising (i) a first indication for the first network node to transmit using the first directional beam, and (ii) a second indication for the second network node to transmit using the second directional beam, wherein determining the beamforming pattern comprises:
determining, based on the first beamforming information, a first plurality of available directional beams with which the first network node is configured to transmit, the first plurality of available directional beams comprising at least a first directional beam and a second directional beam, each directional beam of the first plurality of available directional beams being configured to transmit within a respective spatial sector;

determining, based on the second beamforming information, a second plurality of available directional beams with which the second network node is configured to transmit, the second plurality of available directional beams comprising at least a third directional beam and a fourth directional beam, each directional beam of the second plurality of available directional beams being configured to transmit within a respective spatial sector;

based on at least the first plurality of available directional beams and the second plurality of available directional beams, determining, by the network entity, a plurality of possible beamformer states comprising at least a first beamformer state and a second beamformer state, the first beamformer state indicating use of at least the first directional beam by the first network node and the third directional beam by the second network node, the second beamforming state indicating use of at least the second directional beam by the first network node and the fourth directional beam by the second network node;

determining, by the network entity, a set of non-desired beamformer states;

defining, by the network entity, the beamforming pattern by selecting at least one of the possible beamformer states that is not among the set of non-desired beamformer states;

transmit to the first network node a first instruction to transmit according to the determined beamforming pattern; and transmit to the second network node a second instruction to transmit according to the determined beamforming pattern.

21. The network entity of claim 20, wherein the network entity is further configured to:

define the beamforming pattern by (i) selecting multiple of the possible beamformer states that are not among the set of non-desired beamformer states, and (ii) specifying that the selected beamformer states will be switched between over time.

22. A system for scheduled transmission comprising:

a plurality of network nodes, the plurality of network nodes comprising a first network node and a second network node, each network device being configured to transmit in sectors using directional transmission beams, the first network node and the second network node being configured to transmit within an overlapping sector;

the first network node being configured to transmit to a schedule-providing entity first beamforming information, the schedule-providing entity comprising a processor, a memory, and one or more of a transmitter and a receiver, the first beamforming information indicating a first set of spatial sectors within which the first network node is configured to transmit using a first set of directional beams, the first set of directional beams comprising at least a first directional beam;

the second network node being configured to transmit to the schedule-providing entity second beamforming information, the second beamforming information indicating a second set of spatial sectors within which the second network node is configured to transmit using a second set of directional beams, the second set of directional beams comprising at least a second directional beam;

the schedule-providing entity being configured to determine, based on at least the first beamforming information and the second beamforming information, a beamforming pattern for the plurality of network nodes according to which concurrent received power from all but one of the plurality of network nodes is below a threshold interference power level in the overlapping sector, the beamforming pattern comprising (i) a first indication for the first network node to transmit using the first directional beam, and (ii) a second indication for the second network node to transmit using the second directional beam, wherein determining the beamforming pattern comprises:

determining, based on the first beamforming information, a first plurality of available directional beams with which the first network node is configured to transmit, the first plurality of available directional beams comprising at least a first directional beam and a second directional beam, each directional beam of the first plurality of available directional beams being configured to transmit within a respective spatial sector;

determining, based on the second beamforming information, a second plurality of available directional beams with which the second network node is configured to transmit, the second plurality of available directional beams comprising at least a third directional beam and a fourth directional beam, each directional beam of the second plurality of available directional beams being configured to transmit within a respective spatial sector;

based on at least the first plurality of available directional beams and the second plurality of available directional beams, determining, by the schedule-providing entity, a plurality of possible beamformer states comprising at least a first beamformer state and a second beamformer state, the first beamformer state indicating use of at least the first directional beam by the first network node and the third directional beam by the second network node, the second beamforming state indicating use of at least the second directional beam by the first network node and the fourth directional beam by the second network node;

determining, by the schedule-providing entity, a set of non-desired beamformer states;

defining, by the network entity, the beamforming pattern by selecting at least one of the possible beamformer states that is not among the set of non-desired beamformer states;

the first network node being configured to receive from the schedule-providing entity a first instruction to transmit according to the beamforming pattern, the beamforming pattern comprising a first indication for the first network node to transmit using the first directional beam;

the second network node being configured to receive from the schedule-providing entity a second instruction to transmit according to the beamforming pattern, the beamforming pattern comprising a second indication for the second network node to transmit using the second directional beam; and the plurality of network nodes being configured to transmit in the overlapping sector according to the beamforming pattern, whereby said transmission according to the beamforming pattern results in concurrent received power from all but one of the plurality of network nodes being below a threshold interference power level.

23. A computer program product comprising a non-transitory computer readable medium comprising a computer program for scheduling transmission from a plurality of network nodes, the plurality of network nodes comprising a first network node and a second network node, the computer program comprising computer program code which, when run on a processing unit of a schedule-providing network entity causes the schedule-providing network entity to:

acquire first beamforming information from the first network node, the first beamforming information indicating a first set of spatial sectors within which the first network node is configured to transmit using a first set of directional beams, the first set of directional beams comprising at least a first directional beam;

acquire second beamforming information from the second network node, the second beamforming information indicating a second set of spatial sectors within which the second network node is configured to transmit using a second set of directional beams, the second set of directional beams comprising at least a second directional beam;

based on at least the first beamforming information and the second beamforming information, determine that the first network node and the second network node are configured to transmit within an overlapping sector;

based on at least the first beamforming information and the second beamforming information, determine a beamforming pattern for the plurality of network nodes according to which concurrent received power from all but one of the plurality of network nodes is below a threshold interference power level in the overlapping sector, the beamforming pattern comprising (i) a first indication for the first network node to transmit using the first directional beam, and (ii) a second indication for the second network node to transmit using the second directional beam, wherein determining the beamforming pattern comprises:

determining, based on the first beamforming information, a first plurality of available directional beams with which the first network node is configured to transmit, the first plurality of available directional beams comprising at least a first directional beam and a second directional beam, each directional beam of the first plurality of available directional beams being configured to transmit within a respective spatial sector;

determining, based on the second beamforming information, a second plurality of available directional beams with which the second network node is configured to transmit, the second plurality of available directional beams comprising at least a third directional beam and a fourth directional beam, each directional beam of the second plurality of available directional beams being configured to transmit within a respective spatial sector;

based on at least the first plurality of available directional beams and the second plurality of available directional beams, determining, by the schedule-providing network entity, a plurality of possible beamformer states comprising at least a first beamformer state and a second beamformer state, the first beamformer state indicating use of at least the first directional beam by the first network node and the third directional beam by the second network node, the second beamforming state indicating use of at least the second directional beam by the first network node and the fourth directional beam by the second network node;

determining, by the schedule-providing network entity, a set of non-desired beamformer states;

defining, by the network entity, the beamforming pattern by selecting at least one of the possible beamformer states that is not among the set of non-desired beamformer states;

transmit to the first network node a first instruction to transmit according to the determined beamforming pattern; and transmit to the second network node a second instruction to transmit according to the determined beamforming pattern.

24. The computer program product of claim 23, wherein the computer program further comprises computer program code configured to cause the first network node to:

transmit using a directional transmission beam in said overlapping sector according to said beamforming pattern.

* * * * *